US008330463B2

(12) United States Patent
Blanz

(10) Patent No.: US 8,330,463 B2
(45) Date of Patent: Dec. 11, 2012

(54) PROTECTION OF A MULTIDIRECTIONAL ANTENNA

(75) Inventor: Martin Blanz, Celle (DE)

(73) Assignee: Baker Hughes Incorporated, Houston, TX (US)

(*) Notice: Subject to any disclaimer, the term of this patent is extended or adjusted under 35 U.S.C. 154(b) by 359 days.

(21) Appl. No.: 12/239,348

(22) Filed: Sep. 26, 2008

(65) Prior Publication Data

US 2009/0091327 A1 Apr. 9, 2009

Related U.S. Application Data

(60) Provisional application No. 60/978,527, filed on Oct. 9, 2007.

(51) Int. Cl.
*G01V 3/08* (2006.01)
*G01V 3/10* (2006.01)

(52) U.S. Cl. ........................................ 324/338; 324/339

(58) Field of Classification Search .................. 324/338, 324/339

See application file for complete search history.

(56) References Cited

U.S. PATENT DOCUMENTS

| | | | |
|---|---|---|---|
| 5,530,358 A * | 6/1996 | Wisler et al. | 324/338 |
| 6,008,646 A | 12/1999 | Griffin et al. | |
| 6,466,872 B1 | 10/2002 | Kriegshauser et al. | |
| 6,838,876 B2 | 1/2005 | Kruspe et al. | |
| 2004/0056663 A1 | 3/2004 | Sinclair et al. | |
| 2005/0006090 A1 | 1/2005 | Chemali et al. | |
| 2005/0030021 A1 | 2/2005 | Prammer et al. | |
| 2006/0065394 A1 | 3/2006 | Clark et al. | |

FOREIGN PATENT DOCUMENTS

EP 0622643 A1 11/1994

* cited by examiner

*Primary Examiner* — Reena Aurora

(74) *Attorney, Agent, or Firm* — Mossman Kumar & Tyler PC

(57) ABSTRACT

The disclosure provides an apparatus and method for estimating one or more formation properties downhole. The apparatus includes a tool body that has a longitudinal axis. The tool body has a number of metallic pillars that are attached to or are an integral part of the tool body. Antenna wires may be positioned on the tool body between the pillars in a plurality of orientations to provide a multidirectional antenna. An insulating material is used to cover the antenna wires. A high magnetic permeability material is placed between the antenna wires and the tool body. The antenna may be configured to operate as a transmitter or as a receiver for a resistivity sensor or an NMR sensor.

23 Claims, 5 Drawing Sheets

PROTECTION OF A MULTIDIRECTIONAL ANTENNA

CROSS-REFERENCES TO RELATED APPLICATIONS

This application claims priority from U.S. Provisional Patent Application Ser. No. 60/978,527 filed on 9 Oct. 2007.

BACKGROUND OF THE DISCLOSURE

1. Field of the Disclosure

This disclosure relates generally to the field of multidirectional antenna design for well logging systems, tools and methods.

2. Description of the Related Art

Wellbores or boreholes for producing hydrocarbons (such as oil and gas) are drilled using a drill string that includes a tubing made up of jointed tubulars or a continuous coiled tubing that has a drilling assembly, also referred to as the bottom hole assembly (BHA), attached to its bottom end. The BHA typically includes a number of sensors, formation evaluation tools, and directional drilling tools. A drill bit attached to the BHA is rotated with a drilling motor in the BHA and/or by rotating the drill string to drill the wellbore. Logging tools using antennas have been commonly used for determination of formation properties. For example, an electromagnetic wave propagation logging tool for determining electrical properties of the formations surrounding the borehole is often deployed in the BHA. Such tools are generally referred to in the oil and gas industry as the resistivity tools. These logging tools make measurements of apparent resistivity (or conductivity) of the formation that, properly interpreted, provide information about the petrophysical properties of the formation surrounding the borehole and fluids contained therein. Resistivity logging tools also are commonly used for logging wells after the wells have been drilled. Such tools are typically conveyed into the wells by wireline. The tools that use wireline are generally referred to as the wireline resistivity tools, while the logging tools used during drilling of the wellbore are generally referred to a the logging-while-drilling (LWD) or measurement-while-drilling (MWD) tools. These resistivity logging tools also are referred to as induction logging tools. For the purpose of this disclosure, the term resistivity tool or induction logging tool is meant to include all such and other versions of the resistivity tools.

Another type of sensor commonly used in formation evaluation is the nuclear magnetic resonance (NMR) tool. In such tools, a static magnetic field is used to align nuclear spins in a region of examination. Upon excitation with an RF magnetic field, these nuclear spins produce electromagnetic signals that are detected by an antenna and, upon further analysis, can provide information about formation properties such as porosity, fluid saturation, diffusivity, and fluid distribution in the pore spaces.

A typical resistivity tool includes one or more receiver coils or antennas spaced from each other and one or more transmitter coils or antennas. Alternating current is passed through the transmitter coil, which induces alternating electromagnetic fields in the earth formation surrounding the wellbore. Voltages are induced in the receiver coils as a result of electromagnetic induction phenomena related to the alternating electromagnetic fields in the formation.

LWD resistivity tools, for the most part, make omni-directional measurements. The portion of the formation that affects the signals typically takes the shape of a torus. The antenna configuration used in these tools usually includes a number of axial slots (along a longitudinal axis of the tool and the wellbore) made in the tool body. An antenna wire loop is made by placing a wire (electrical conductor) over the slots, perpendicular to the tool longitudinal axis. The longitudinal tool axis is also referred to as the "tool axis." A ferrite material is often placed in the slots below the wire to increase the efficiency of transmitting antennas or to increase the sensitivity of receiving antennas.

Such axial antennas are also used in NMR measurements. An important aspect of using antennas for both NMR and resistivity measurements is that of protecting the antennas from the hostile borehole environment while, at the same time, allowing the antennas to transmit and/or receive electromagnetic signals. For example, FIG. 2 shows a cross sectional view of an axial antenna for NMR measurements from U.S. Pat. No. 6,838,876 to Kruspe et al., having the same assignee as the present disclosure and the contents of which are incorporated herein by reference. Shown therein is a cross section of the antenna cover 200. The antenna cover 200 is made of stainless steel 5 millimeters thick 202 with 10-millimeter wide slots 204 separated by a 10-millimeter wide rib 206 between each slot 204. The surface 208 of the stainless steel antenna cover 200 is galvanized with copper to reduce resistance and reduce losses from induced eddy currents. The antenna cover slots 204 may be filled with any material 205, for example, rubber, reinforced plastic, epoxy, or any substance that enables passage of electromagnetic energy through the slots. The slot-filling material may be non-electrically conducting. The ends of the slots may be filled with soft magnetic material 210 such as powdered iron bound in epoxy to increase magnetic permeability at the ends of the slots. While slots are shown in the example, any transmissive section formed in the antenna cover is within the scope of the disclosure. In one embodiment, the slots 204 and ribs 206 circumscribe the circumference of the antenna cover, however, in an alternative embodiment, the slot and ribs can cover less than all of the antenna cover circumference, such as, covering only half or one-fourth of the antenna cover circumference to form a side-looking NMR antenna transmission and reception pattern. Alternatively, some of the slots can be formed and filled with non-RF transmissive material to block RF emissions in order to form a side-looking or beam-forming antenna cover. The slotted antenna cover may also be made from beryllium copper or a copper nickel alloy. These materials are wear resistant and desirable for their ruggedness and resistance to abrasion in the downhole environment.

Resistivity tools also have been developed that are sensitive to the azimuthal direction of a resistivity contrast within the depth of investigation of the tool. In such tools, the antenna wire is not perpendicular to the tool axis. Therefore, the slots for the placement of the ferrite material for such antennas are also not oriented along the tool axis. Such slots are tilted relative to the tool axis and in an extreme case are formed perpendicular to the tool axis, i.e., along the radial direction of the tool body or a housing. These slots are in the form of continuous notches made in the metallic housing. However, continuous slots made into a section of an LWD resistivity tool body, such as in a section of a drill collar, reduce mechanical strength of the tool body, which can result in developing cracks when the tool body is subjected to high bending loads during drilling of a wellbore. U.S. patent application Ser. No. 11/854,882 of Peter et al., having the same assignee as the present disclosure and the contents of which are incorporated herein by reference, discloses an antenna that includes at least two groups of slots, each group having at least two rows, each row having at least one slot therein; and at least one wire is placed over the slots in each row that is not perpendicular to the tool axis (non-parallel to the radial axis). This is illustrated in FIG. 3.

FIG. 3 shows a perspective view of an antenna carrier 300 that includes a metallic carrier 320 (also referred to herein as a housing, sleeve or metallic member). The antenna configuration shown in FIG. 3 is of an x-transverse antenna, in which circumferential notches made in the metallic member 320 are divided or segmented into slots, each slot containing a suitable high magnetic permeability material, such as a ferrite material. As shown in FIG. 3, the first circumferential notch 310*a* is made up of an array of "m" spaced apart slots, such as slots 310*a*1 through 310*am*, while the last notch 310*n* is made up of "m" slots 310*n*1 through 310*nm*. In the example of FIG. 3, each notch is made in the direction perpendicular to the tool axis ("z-axis), i.e., along the circumferential direction of the carrier 320. Similarly, each of the other notches, such as notch 310*b* through 310*n*−1, is made up of similar number of slots formed in the circumferential direction. Thus, in the example of FIG. 3, the antenna includes multiple notches, each containing three slots. In the configuration of FIG. 3, the slots 310*a*1 through 310*n*1 (i.e., one slot from each notch along a common direction, which in this particular case is the z-direction) form a first row of slots belonging to the set of slots shown. Similarly slots 310*a*2 through 310*n*2 and 310*am* through 310*nm*, each respectively forms the second and third rows of slots. The number of notches, slots and rows contained in each antenna is a design choice and thus may vary from one design to another. As disclosed therein, antenna wires can be positioned to have transverse orientation.

Multicomponent resistivity logging tools require antennas with both axial and transverse orientation. See, for example, U.S. Pat. No. 6,466,872 to Kriegshauser et al., having the same assignee as the present disclosure and the contents of which are incorporated herein by reference. U.S. patent application Ser. No. 11/858,717 of Signorelli having the same assignee as the present disclosure and the contents of which are incorporated herein by reference teaches the use of collocated antennas for multicomponent resistivity tools. The disclosure in Signorelli specifies different set of aligned parallel grooves for each component. Such an arrangement may be perfectly satisfactory for wireline applications, but for MWD applications, having a large number of grooves could weaken the drill collar. It should be noted that multicomponent antennas may also be used in NMR tools.

The disclosure herein provides improved tools, system and methods for estimating or determining a formation property downhole.

SUMMARY OF THE DISCLOSURE

One embodiment of the present disclosure is an antenna arrangement having multidirectional sensitivity. The antenna arrangement includes a tool body having a longitudinal shape. A plurality of metal pillars on the exterior of the tool body define spaces between them in which antenna wires for each of a plurality of directions of sensitivity are positioned. The metal pillars may be attached to the tool body or may be an integral part of the tool body. An electrically insulating material covers the antenna wires and protects them from the borehole environment. A high magnetic permeability material may be placed in the space between the antenna wires and the tool body. The material may include a soft-magnetic ferrite material, a soft-magnetic amorphous metal alloy, a nanocrystalline soft-magnetic metal alloy, a stack made of amorphous soft-magnetic metal alloy, a stack made of a nanocrystalline soft-magnetic metal alloy, a soft-magnetic iron powder containing at least one of an organic and an inorganic binder, a soft-magnetic Sendust containing at least one of an organic and an inorganic binder, and/or a soft-magnetic nickel iron alloy powder containing at least one of an organic and an inorganic binder. The directions of sensitivity of the antenna may include longitudinal and transverse directions.

Another embodiment of the disclosure is a method of evaluating an earth formation. The method includes conveying a logging tool into a borehole having a plurality of metal pillars on an exterior of a body of the logging tool and electrical conductors positioned in spaces between the metal pillars defining a plurality of antennas, each of the plurality of antennas having an associated direction of sensitivity different from a direction of sensitivity of each of the other of the plurality of antennas; activating one of the plurality of antennas to produce an electromagnetic field in the earth formation; and using a signal received by the same or another one of the plurality of antennas responsive to the electromagnetic field to estimate a property of the earth formation.

Another embodiment of the disclosure is a computer-readable medium accessible to a processor. The computer-readable medium includes instructions which enable the processor to use a signal from an antenna on a logging tool having a plurality of metal pillars on an exterior of a body of the logging tool and electrical conductors positioned in spaces between the metal pillars defining a plurality of antennas.

BRIEF DESCRIPTION OF THE DRAWINGS

The various features, characteristics and operations of the resistivity tools and methods of using the same disclosed herein will be better understood from the following detailed description and the appended drawings in which like elements are generally designated by like numerals, wherein.

DETAILED DESCRIPTION OF THE DISCLOSURE

Figure 1:
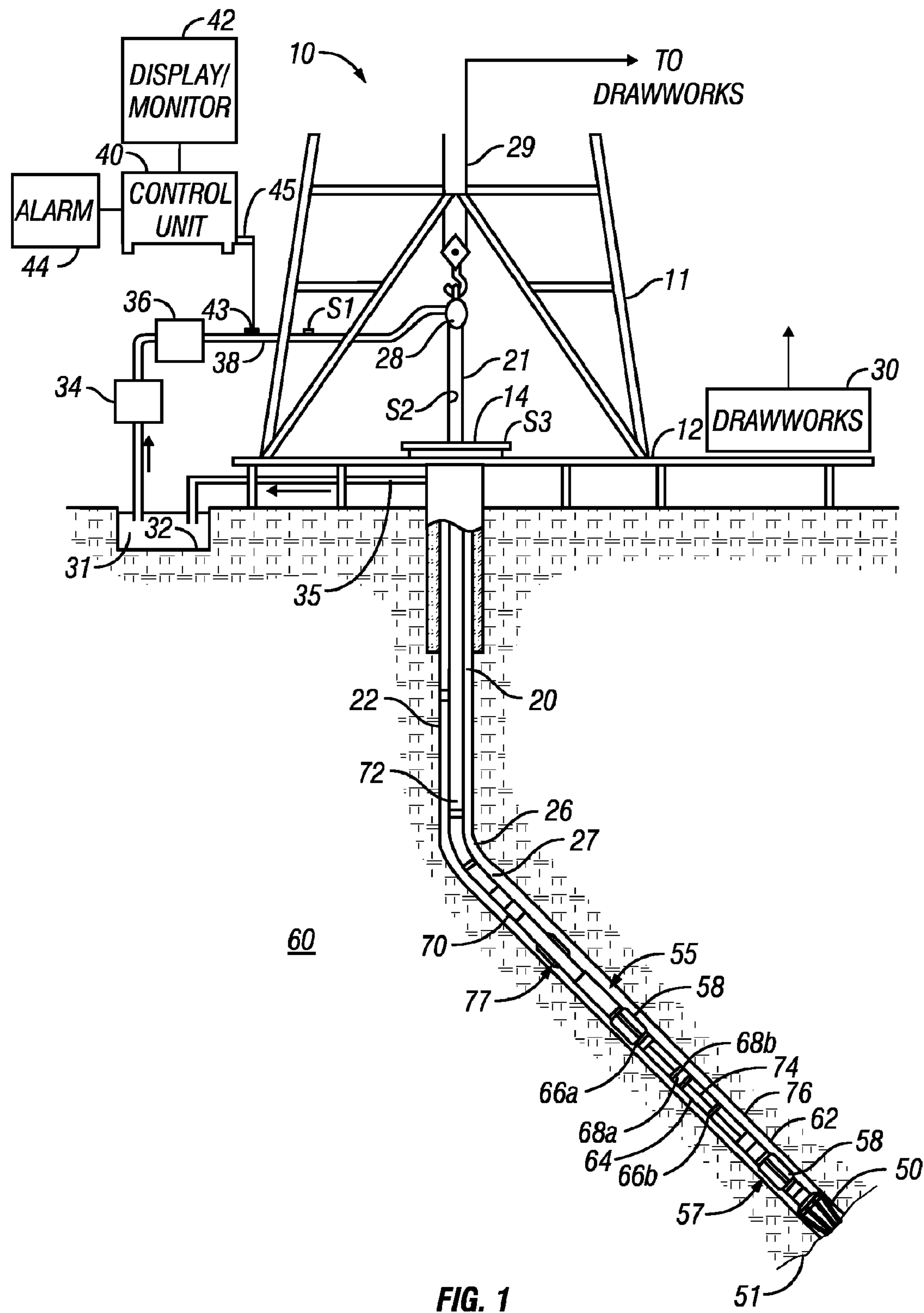
FIG. 1 shows a schematic diagram of an exemplary drilling system having a drill string containing a drilling assembly that includes a tool made according to one embodiment of the present disclosure.
Figure 2:
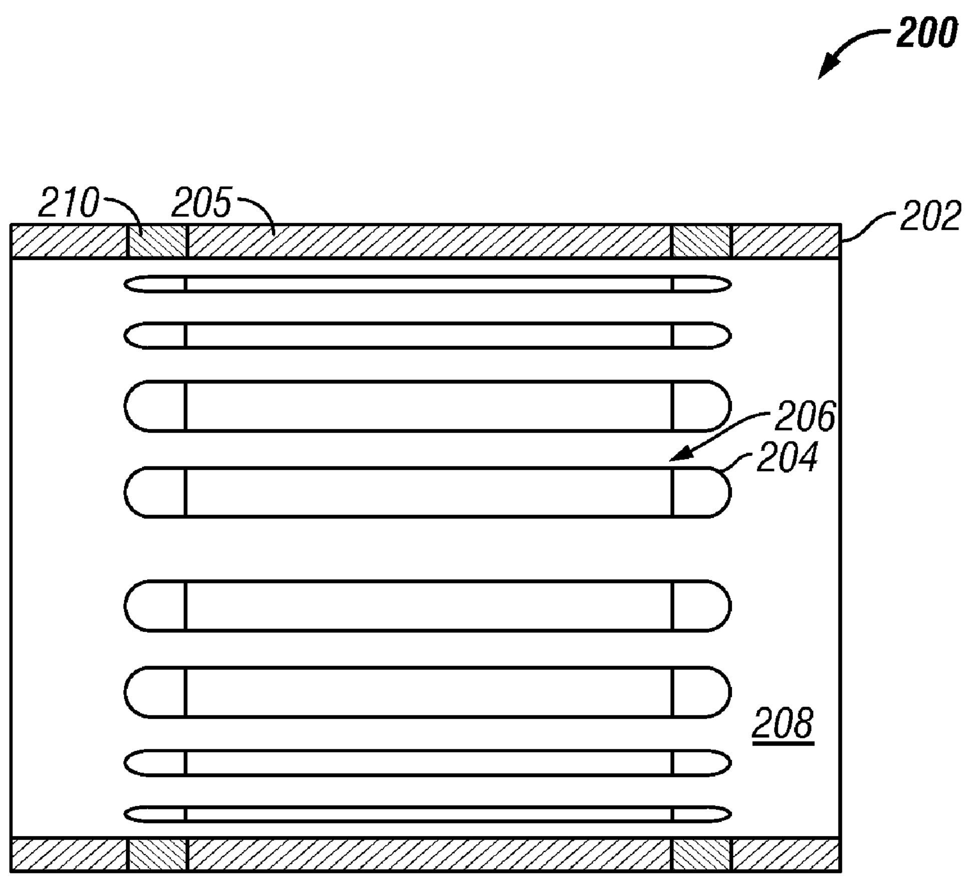
FIG. 2 (prior art) is a cross sectional view of an axial antenna for NMR measurements.
Figure 3:
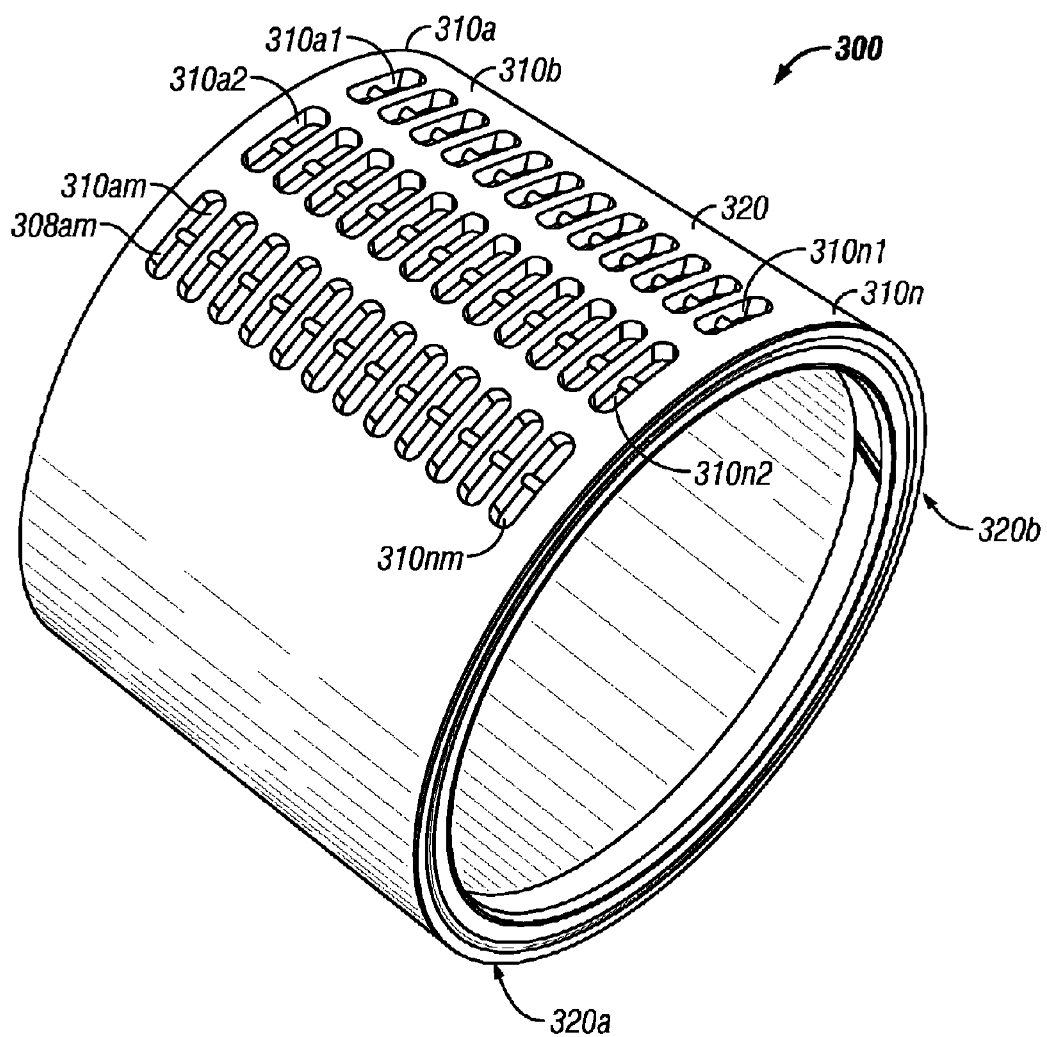
FIG. 3 (prior art) shows a perspective view of an antenna carrier that has slots made for an azimuthally sensitive transverse antenna.

FIG. 1 shows a schematic diagram of a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A drill bit 50, attached to the end of the BHA 90, disintegrates the geological formations when it is rotated to drill the borehole 26. The drill string

20 is coupled to a drawworks 30 via a kelly joint 21, swivel 28 and line 29 through a pulley 23. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26.

In some applications the drill bit 50 is rotated by only rotating the drill pipe 22. However, in other applications, a drilling motor 55 (mud motor) disposed in the drilling assembly 90 is used to rotate the drill bit 50 and/or to superimpose or supplement the rotation of the drill string 20. In either case, the rate of penetration (ROP) of the drill bit 50 into the borehole 26 for a given formation and a drilling assembly largely depends upon the weight on bit and the drill bit rotational speed.

In one aspect of the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

Referring back to FIG. 1, drilling assembly 90 also contains other sensors and devices or tools for providing a variety of measurements relating to the formation surrounding the borehole and for drilling the wellbore 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the drill bit 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the drill bit 50 via a hollow shaft that also enables the drilling fluid to pass from the mud motor 55 to the drill bit 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication between the surface and the BHA 90, including but not limited to, an acoustic telemetry system, an electromagnetic telemetry system, a wireless telemetry system that may utilize repeaters in the drill string or the wellbore and a wired pipe. The wired pipe may be made up by joining drill pipe sections, wherein each pipe section includes a data communication link that runs along the pipe. The data connection between the pipe sections may be made by any suitable method, including but not limited to, hard electrical or optical connections and induction methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the wellbore by a suitable injector while the downhole motor, such as mud motor 55, rotates the drill bit 50. For offshore drilling, an offshore rig or a vessel is used to support the drilling equipment, including the drill string.

Figure 4:
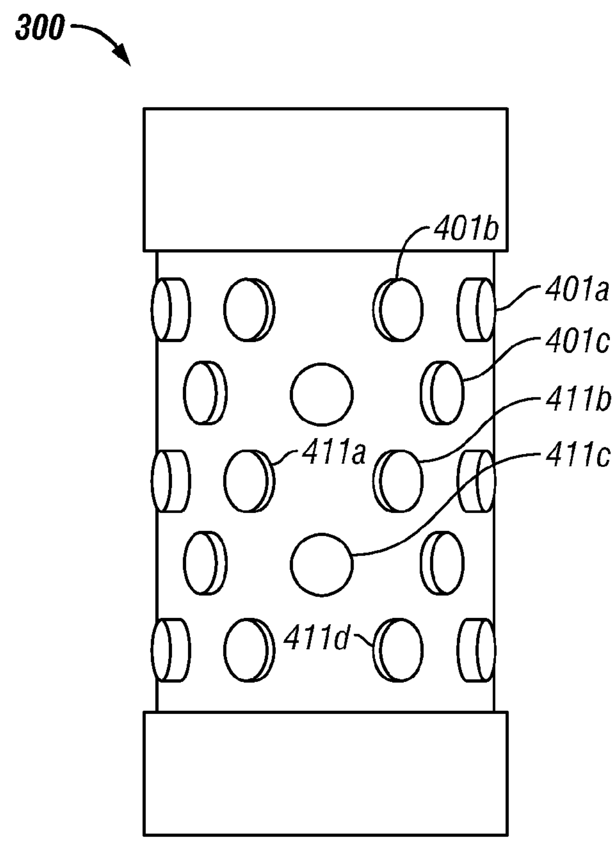
FIG. 4 shows a view of an antenna cover according to one embodiment of the present disclosure.

Turning now to FIG. 4, the principle of the present disclosure is illustrated. The antenna is ruggedized by having a plurality of metal pillars 401*a*, 401*b*, 401*c*. . . that may be rigidly connected to the tool body or may be an integral part of the tool body. The term “pillar” is to be given its ordinary dictionary meaning of “a firm upright support for a superstructure.” The spaces 411*a*, 411*b*, 411*c*, 411*d*. . . between the pillars are used for coil windings, discussed below with reference to FIGS. 5-6. The antenna wires (or conductors) are then covered with an electrically non-conducting material. It should be noted that the pillars are circular, and the elliptical appearance of the pillars away from the center is a distortion. However, other shapes of the pillar may be used. As can be seen, the pillars are separated in both a longitudinal and a circumferential direction.

Turning now to FIG. 4, the principle of the present disclosure is illustrated. The antenna is ruggedized by having a plurality of metal pillars 401*a*, 401*b*, 401*c*. . . that may be rigidly connected to the tool body or may be an integral part of the tool body. The term “pillar” is to be given its ordinary dictionary meaning of “a firm upright support for a superstructure.” The spaces 411*a*, 411*b*, 411*c*, 411*d*. . . between the pillars are used for coil windings, discussed below with reference to FIGS. 5-6. The antenna wires (or conductors) are then covered with an electrically non-conducting material. It should be noted that the pillars are circular, and the elliptical appearance of the pillars away from the center is a distortion. However, other shapes of the pillar may be used.

Figure 5:
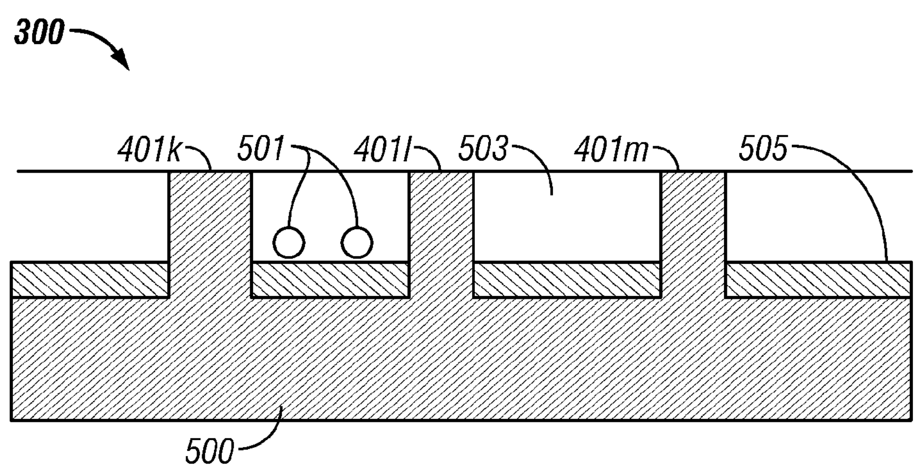
FIG. 5 shows an arrangement of antenna wires used with the antenna cover of FIG. 4.

Turning now to FIG. 5, a cross-section of the antenna is illustrated. The metal pillars are denoted by 401*k*, 401*l*, 401*m* . . . attached to or part of the tool body 500. The shape of the pillars is not intended to be a limitation, and in one embodiment, the pillars are tapered so that they are narrower at the bottom. The tapering provides support for the antenna wires 501, the electrically non-conducting material 503 and the material with high magnetic permeability 505.

Figure 6:
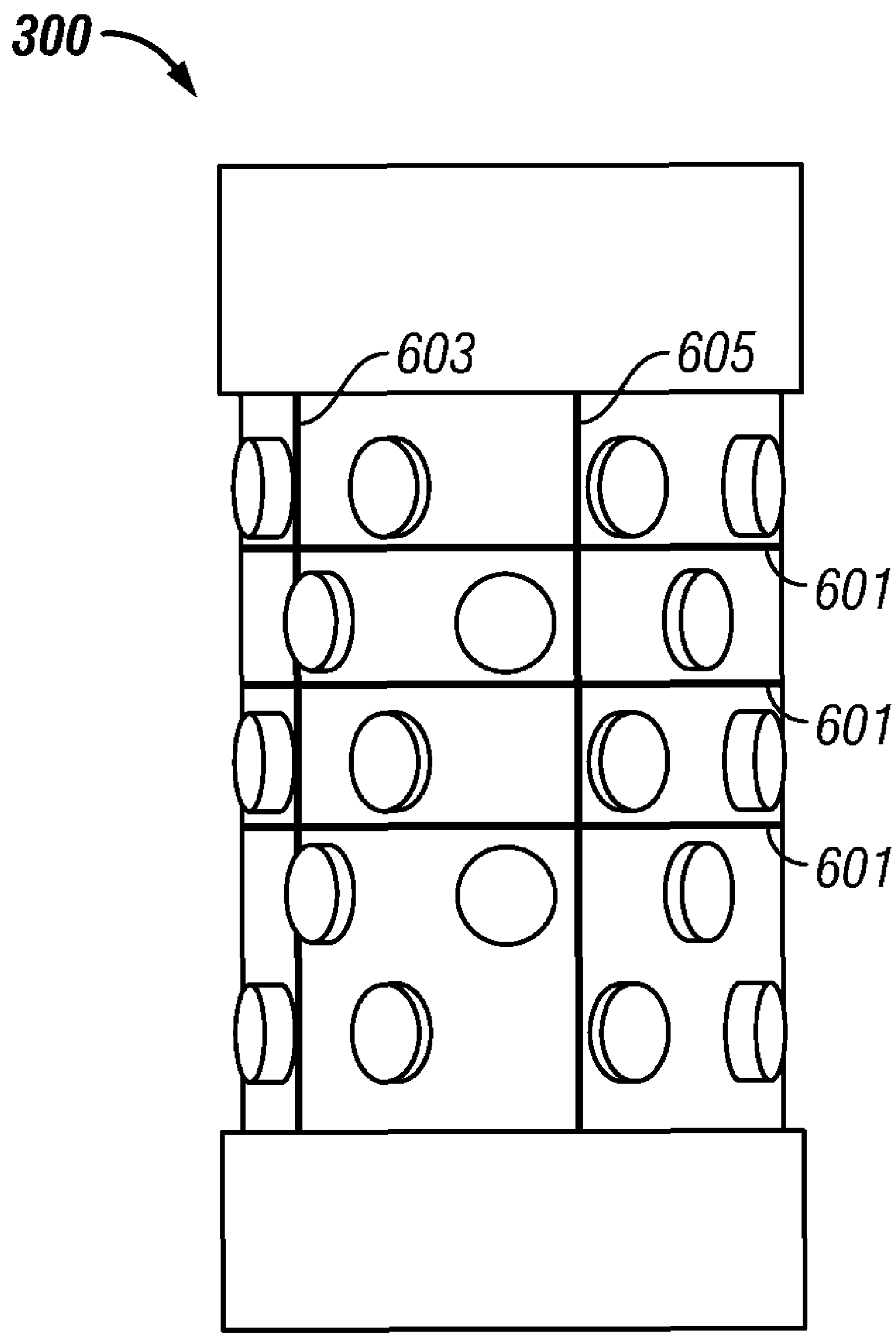
FIG. 6 illustrates a possible arrangement of antenna wires for multicomponent measurements using the antenna cover of FIG. 4.

FIG. 6 shows a possible arrangement of the antenna wires. The wires 601 define a z-oriented antenna. Two exemplary transverse coils 603, 605 are shown. These define x- and y-oriented antenna coils.

Those versed in the art and having benefit of the present disclosure would recognize that with the pillar arrangement shown, it is possible to have antenna coils inclined at other than just transverse angles.

The structures and methods described herein may be used in tools conveyed on a wireline, as an MWD or LWD tools conveyed by a drilling tubular, or as a tool conveyed on a wired pipe. The antennas may be part of a resistivity tool or a nuclear magnetic resonance (NMR) tool. Each antenna is coupled to a transmitter or a receiver circuit as the case may be. The transmitter circuit includes an oscillator and other related circuitry that causes its associated antenna to transmit electromagnetic signals at one or a plurality of frequencies. The tool includes a controller that contains a processor, such as a microprocessor, and associated circuits, such as memory and signal processing circuitry, and programmed instruction accessible to the processor for controlling the operation of the transmitter. The receiver circuits include circuits to receive signals detected by the coils, and to amplify and digitize such signals. For a resistivity logging tool, the controller processes the detected signals according to programmed instructions and provides an estimate of an electrical property of the formation or a downhole fluid. The electrical property may be a resistivity, a conductivity and/or a dielectric constant, and, in the case of an anisotropic formation, horizontal and vertical properties. For an NMR tool, the controller may determine properties including longitudinal and transverse relaxation times and distributions, porosities, clay content, bound water moveable, and bound water irreducible. The signals from each receiver may be processed downhole, at the surface or in part downhole in the tool and in part at the surface. The estimated values of the property or properties of interest are recorded or stored in a suitable medium, such as a solid state memory, hard drive, a magnetic tape, etc. The data or results obtained downhole may be transmitted to the surface and/or stored in memory in the tool. The above described circuits are generally known in the art and are thus not described in detail. As noted earlier, two or more antennas may be stacked at the same or substantially the same location on the tool body. Each such antenna may be configured to transmit into and/or receive from the formation electromagnetic radiations at a particular direction. The same antenna or different antennas may be used for generating an electromagnetic field and for receiving a signal. The transmitter antenna and the receiver antenna may be proximate to each other or may be spaced apart from each other where long spaced resistivity measurements are desired. The transmitter antennas and the receiver antennas may be on the same antenna arrangement as discussed above, or the logging tool may include two such antenna arrangements. The disclosure also envisages that a conventional antenna may be used as a transmitter or a receiver separate from the antenna arrangement described above.

A high magnetic permeability material may be placed in between the antenna wires and the tool body. Any suitable high magnetic permeability material may be used, including but not limited to: (i) a soft-magnetic ferrite material; (ii) an electrically conductive soft-magnetic amorphous alloy; (iii) an electrically conductive nanocrystalline soft-magnetic alloy; (iv) a stack made of amorphous soft-magnetic alloy; (v) a stack made of a nanocrystaline soft-magnetic alloy; (vi) a soft-magnetic iron powder containing at least one of an organic and an inorganic binder; (vii) a soft-magnetic Sendust containing at least one of an organic and an inorganic binder; and (viii) a soft-magnetic nickel iron alloy powder containing at least one of an organic and an inorganic binder. Alternatively, the antenna wires may be positioned with a standoff from the tool body. Sendust is a magnetic metal powder that was invented at Tohoku Imperial University.

The operation of the transmitter and receivers may be controlled by one or more processors. For wireline applications or for wired pipe applications, the downhole processor and/or the surface processor may be used. Part of the processing may be done at a remote location away from the wellbore. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to certain exemplary embodiments, various modifications will be apparent to those skilled in the art. It is intended that all such modifications be considered as part of the concepts described herein.

What is claimed is:

1. An apparatus configured to evaluate an earth formation, the apparatus comprising:

a logging tool configured to be conveyed in a borehole, the logging tool having a longitudinal axis;

a plurality of pillars radially extending outward from an exterior of a body of the logging tool, a space separating each pillar of the plurality of pillars in a direction that is parallel and non-parallel to the longitudinal axis of the logging tool; and a plurality of antennas defined by electrical conductors positioned in the spaces separating the pillars, wherein the space is configured to allow the plurality of antennas to be oriented parallel and non-parallel to the longitudinal axis of the logging tool.

2. The apparatus of claim 1 wherein at least one of the plurality of antennas has a direction of sensitivity different from a direction of sensitivity of another of the plurality of antennas.

3. The apparatus of claim 1 wherein the pillars are attached to the body of the logging tool.

4. The apparatus of claim 1 wherein the pillars are integrally formed with the body of the logging tool.

5. The apparatus of claim 1 further comprising an electrically insulating material disposed on an exterior of the electrical conductors, the electrically insulating material configured to protect the electrical conductors from a borehole environment.

6. The apparatus of claim 1 further comprising a high magnetic permeability material disposed between the electrical conductors and the body of the logging tool.

7. The apparatus of claim 6 wherein the high magnetic permeability material is selected from the group consisting of: (i) a soft-magnetic ferrite material, (ii) a soft-magnetic amorphous metal alloy, (iii) a nanocrystalline soft-magnetic metal alloy, (iv) a stack made of amorphous soft-magnetic metal alloy, (v) a stack made of a nanocrystalline soft-magnetic metal alloy, (vi) a soft-magnetic iron powder containing at least one of an organic and an inorganic binder, (vii) a soft-magnetic Sendust™ containing at least one of an organic and an inorganic binder, and (viii) a soft-magnetic nickel iron alloy powder containing at least one of an organic and an inorganic binder.

8. The apparatus of claim 1 wherein at least one of the plurality of antennas comprises a transmitter antenna, the apparatus further comprising a processor configured to:

(i) activate the transmitter antenna and generate an electromagnetic field in the earth formation, and (ii) use a signal responsive to the generated electromagnetic field from a receiver antenna on the logging tool to estimate a property of the earth formation.

9. The apparatus of claim 8 wherein the property is selected from the group consisting of: (i) a resistivity property, and (ii) a property determinable from a nuclear magnetic resonance signal.

10. The apparatus of claim 1 wherein at least one of the plurality of antennas comprises a receiver antenna, the apparatus further comprising a processor configured to:

(i) activate a transmitter antenna on the logging tool and generate an electromagnetic field in the earth formation; and (ii) use a signal from the receiver antenna responsive to the generated electromagnetic field to estimate a property of the earth formation.

11. The apparatus of claim 1 further comprising a conveyance device configured to convey the logging tool into the borehole, the conveyance device selected from (i) a wireline, (ii) a drilling tubular, (iii) a wired pipe and (iv) a slickline.

12. The apparatus of claim 1, wherein the pillars are metal pillars.

13. The apparatus of claim 1 wherein at least one of the plurality of pillars has a circular shape.

14. A method of evaluating an earth formation, the method comprising:

conveying a logging tool into a borehole having a longitudinal axis, a plurality of metal pillars on an exterior of a body of the logging tool and electrical conductors positioned in a space between the metal pillars defining an antenna arrangement having a plurality of antennas, wherein the space separates each pillar of the plurality of pillars in a direction that is parallel and non-parallel to the longitudinal axis of the logging tool; and performing an operation selected from:

(i) using an antenna of the antenna arrangement to produce an electromagnetic field in the earth formation and using a signal received by an antenna on the logging tool to estimate a value of a property of the earth formation, and (ii) using an antenna on the logging tool to produce an electromagnetic field in the earth formation and using a signal received by an antenna of the antenna arrangement to estimate a value of a property of the earth formation.

15. The method of claim 14 wherein the one of the plurality of antennas that is activated is the same as the one of the plurality of antennas that is used to receive the signal.

16. The method of claim 14 further comprising attaching the pillars to the body of the logging tool.

17. The method of claim 14 further comprising disposing an electrically insulating material on an exterior of the electrical conductors and using the electrically insulating material to protect the electrical conductors from a borehole environment.

18. The method of claim 14 further comprising using a high magnetic permeability material between the electrical conductors and the body of the logging tool.

19. The method of claim 14 further comprising conveying the logging tool into the borehole using a conveyance device selected from (i) a wireline, (ii) a drilling tubular, (iii) a wired pipe or (iv) a slickline.

20. The method of claim 14 wherein the estimated property is selected from the group consisting of: (i) a resistivity property, or (ii) a property determinable from a nuclear magnetic resonance signal.

21. The method of claim 14, wherein the pillars are metal pillars.

22. A non-transitory computer-readable medium having instructions thereon that when read by a processor cause the processor to execute a method, the method comprising:

using a signal from an antenna on a logging tool having a plurality of pillars spaced apart at least in a longitudinal direction on an exterior of a body of the logging tool conveyed in a borehole in an earth formation and having electrical conductors positioned in a space between the metal pillars defining a plurality of antennas, to estimate a property of the earth formation, wherein the logging tool has a longitudinal axis, and wherein the space separates each pillar of the plurality of pillars along the longitudinal axis and in a circumferential direction.

23. The non-transitory computer-readable medium of claim 22 further comprising at least one of: (i) a ROM, (ii) an EPROM, (iii) an EAROM, (iv) a flash memory, or (v) an optical disk.

* * * * *